United States Patent
Chida et al.

[19]

[11] Patent Number: 6,016,519
[45] Date of Patent: Jan. 18, 2000

[54] DATA COMMUNICATION SYSTEM, DATA COMMUNICATION DEVICE AND MEMORY MEDIUM, FOR STORING DATA COMMUNICATION PROGRAM

[75] Inventors: Makoto Chida, Kunitachi; Kazuo Iwata; Akiyoshi Shimoda, both of Yokohama, all of Japan

[73] Assignee: Canon Kabushiki Kaisha, Tokyo, Japan

[21] Appl. No.: 08/980,206

[22] Filed: Nov. 28, 1997

[30] Foreign Application Priority Data

Nov. 29, 1996 [JP] Japan .................................. 8-320061

[51] Int. Cl.[7] .................................................. G06F 13/14
[52] U.S. Cl. ........................... 710/19; 340/635; 340/644; 340/654
[58] Field of Search ............................ 395/839; 340/644, 340/654, 635; 710/15, 19

[56] References Cited

U.S. PATENT DOCUMENTS

| | | | |
|---|---|---|---|
| 4,647,721 | 3/1987 | Busam et al. ............................ | 379/102 |
| 4,691,143 | 9/1987 | Lange ....................................... | 315/133 |
| 4,864,285 | 9/1989 | Rodden .................................... | 340/644 |
| 5,477,476 | 12/1995 | Schanin et al. .......................... | 364/707 |
| 5,483,656 | 1/1996 | Oprescu et al. ......................... | 395/750 |
| 5,506,573 | 4/1996 | Ewing et al. ............................ | 340/644 |
| 5,758,171 | 5/1998 | Ramamurthy et al. ............ | 395/750.01 |

*Primary Examiner*—Thomas C. Lee
*Assistant Examiner*—Abdelmoniem I. Elamin
*Attorney, Agent, or Firm*—Fitzpatrick, Cella, Harper & Scinto

[57] ABSTRACT

Disclosed is a system, for exchanging data among a plurality of devices, wherein a device can detect the state of another device without that device being powered on, and whereby usability can be enhanced.

According to the system, during data communication a power supply device supplies power to a power reception device, and activates sections necessary for the power reception device. The state of the power reception device is detected by a power management unit, and the information that is obtained is transmitted across a data I/F unit to the power supply device, and stored in a storage unit. Based on the stored status information, the supply of power to the power reception device can be controlled.

16 Claims, 13 Drawing Sheets

DATA COMMUNICATION SYSTEM, DATA COMMUNICATION DEVICE AND MEMORY MEDIUM, FOR STORING DATA COMMUNICATION PROGRAM

BACKGROUND OF THE INVENTION

1. Field of the Invention

The present invention relates to a data communication system for exchanging data among a plurality of devices, a data communication device therefor, and a memory medium on which a data communication program is recorded.

2. Related Background Art

Conventionally, a communication system is well known wherein a whole processing device for controlling the entire system is connected by a cable with a device to be controlled, each device having an interface by which data can be exchanged and power can be supplied. A PBX or a public network, for example, has a function whereby communication, which is the basic function, is enabled during a blackout. Also, along an ISDN line, which is a digital public network, a maximum power of 420 mW (40 V) is separately supplied.

There are other systems that employ cables constituted by power feed lines and signal lines across which power is supplied and signals are exchanged. An example of such a system is one where a personal computer is connected by cables to a keyboard and a mouse. The implementation of this system is required because a keyboard and a mouse are absolutely necessary devices for a personal computer, and because there is a need to reduce the size and the weight of the devices and to eliminate the complicated wiring that is employed for accessories, such as the AC cord and a power adaptor.

Since the above described devices require only small amounts of power, sufficient power for their needs can be supplied by a station switch, a PBX or a PC (personal computer). Power supplied in this manner is not adequate for devices that require intermediate or large supplies of power, such as facsimile machines, multi-function telephones, monitors or printers, and external power sources are prepared for such devices to ensure a power capacity.

In particular, monitors and printers do not receive power from PCs, and are connected to the PC only by signal lines for data exchange and the transmission of control commands and status information.

However, in the above described conventional data communication system, when a device that is operated by power supplied by an external power source is powered off, the device is naturally halted. And when, for example, a PC is to examine the state of one of its peripheral devices, the device must be powered on temporarily and set to an operational state to enable the acquisition of necessary information. If the device is in the OFF state, the PC can not obtain information as to whether the device is powered off, no cable is connected to the device, or the device is in the operation disabled state.

In addition, a lack of paper, ink or toner, or a paper jam can not be detected unless a printer is powered on.

To resolve the above shortcomings, it is one object of the present invention to provide a data communication system that can detect the state of a device without powering the device on, and that can thus provide improved usability.

SUMMARY OF THE INVENTION

It is one object of the present invention to resolve the above described shortcomings all at one time or individually (at least one).

It is another object of the present invention to obtain information concerning the state of another device without having to power the device on.

It is an additional object of the present invention to obtain information concerning various states of another device having a small power consumption without having to power the device on.

To achieve the objects, according to the preferred embodiments of the present invention, disclosed is a system, which exchanges data among a plurality of devices, comprising:

power supply means for supplying power from a first device to a second device, detection means for detecting a state of the second device by employing power supplied by the power supply means, transmission means for transmitting status information detected by the detection means to the first device, and storage means for storing the status information for the second device, which is received by the first device, wherein the first device outputs the status information for the second device that is stored in the storage means.

The above described system further comprises:

division means for dividing power supplied by the power supply means, and switching means for sequentially switching power that is divided by the division means in order to activate individual sections. The detection means detects the state of the device in the order in which the individual sections are activated by the switching means.

It is a further object of the present invention to provide an innovative interface function that conforms to the IEEE 1394 standards or USB standards.

It is still another object of the present invention to provide an innovative interface that is suitable for a printer.

The other objects and features of the present invention will become apparent during the course of the subsequent explanation of the embodiments given while referring to the accompanying drawings.

DETAILED DESCRIPTION OF THE PREFERRED EMBODIMENTS

Figure 1:
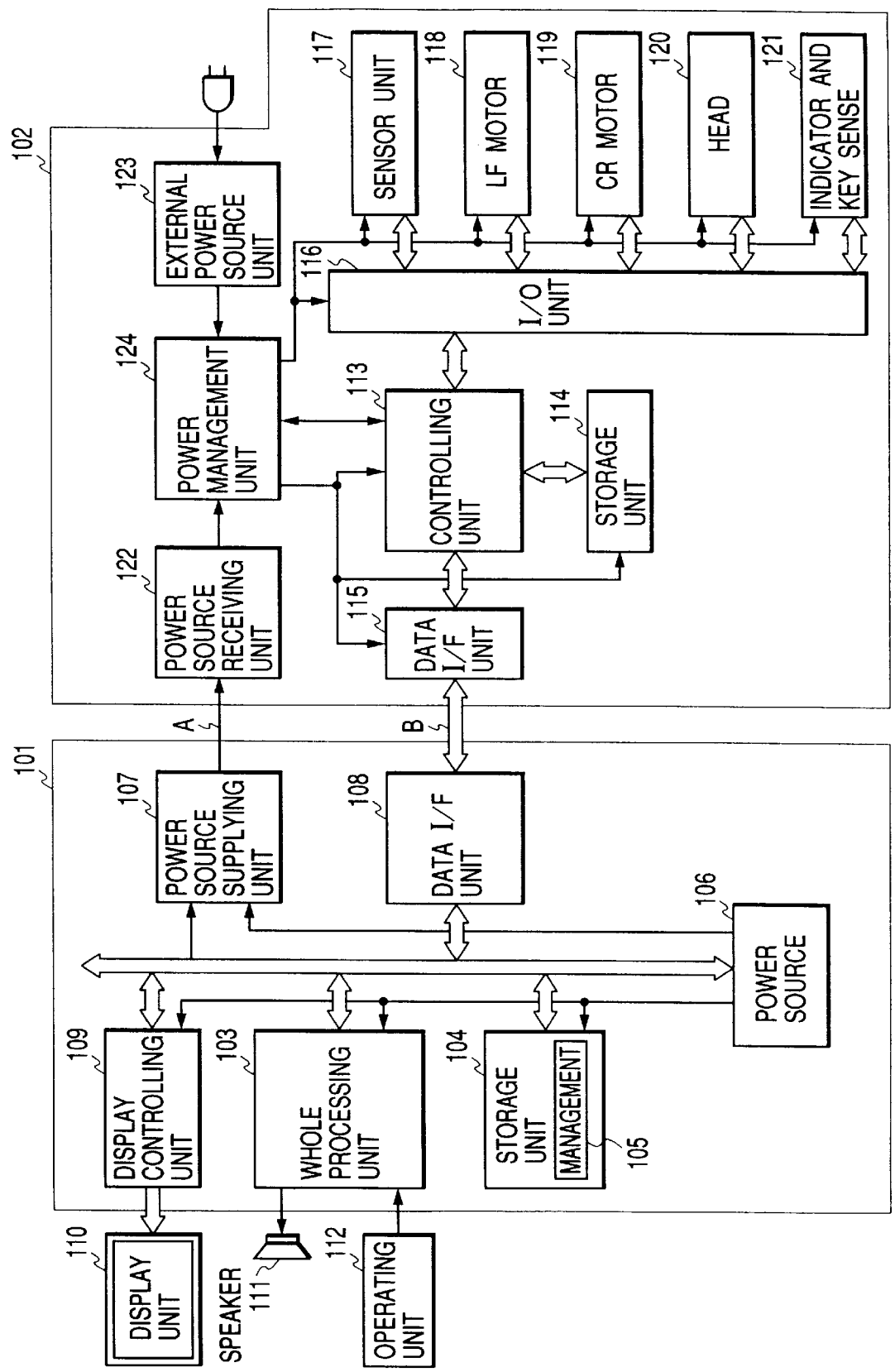
FIG. 1 is a block diagram illustrating a system arrangement according to a first embodiment of the present invention.

FIG. 1 is a block diagram illustrating the arrangement according to a first embodiment of the present invention. In FIG. 1, an example system is shown where data communication and power exchange are performed between two devices.

In FIG. 1, a power supply device (first device) 101 supplies power that is transmitted to and received by a power reception device (second device) 102. A whole processing unit 103 controls the entire power supply device 101, and a storage unit (storage means) 104 stores programs and data that the whole processing unit 103 requires for its processing. The storage unit 104 includes a power management information storage unit 105 for managing the power required by the connected power reception device 102 and the state while power is being supplied. In this embodiment, the power supply device 101 is, for example, a computer, and the power reception device 102 is, for example, an ink-jet printer.

A power source 106 feeds power to a power source supplying unit 107, which in turn supplies this power to the power reception device 102. A data I/F (interface) unit 108 performs data communications with the connected power reception device 102, and a display control unit 109 controls a display unit 110 on which are displayed image data, such as graphic and text data, generated by the whole processing unit 103. The display unit 110 receives data from the display control unit 109 and displays it on a screen.

A loudspeaker 111 is employed to output tone data generated by the whole processing unit 103, and an operating unit 112 is manipulated by a user to control the power supply device 101.

A control unit 113 controls the entire power reception device 102 and the interface; a storage unit 114 stores programs and data for the control unit 113; a data I/F unit (transmission means) 115 performs data communications with the power supply device 101; an I/O unit 116 is connected to the individual units of the power reception device 2 to acquire matches; and a sensor unit (detection means) 117 detects the state of the power reception device 102. The detected state is transmitted by the data I/F unit 115 to the power supply device 101 where it is stored in the storage unit 104.

A motor 118, such as an LF motor, moves paper in a paper feeding direction in a printer; a CR motor 119 drives a head 120, which is used for printing data on a paper surface, perpendicular to the paper feeding direction; an indicator and key sensor 121 is a display and key input portion; a power source receiving/supplying unit 122 receives power from the power source supplying unit 107 in the power supply device 101. Power is supplied to predetermined sections that are required by the power reception device 102 to perform basic data communications with the power supply device 101.

An external power source unit 123 receives power from an external power source; and a power management unit 124 manages the power supplied by the power source receiving/supplying unit 122 and the external power source unit 123 and transmits it to the individual sections, such as the data I/F unit 115, the control unit 113 and the I/O unit 116.

In the above described system, since the entire power reception device 102 can be activated upon the receipt of power from the external power source unit 123, a normal operation can be performed. However, as the supply of power available from the power source supplying unit 107 of the power supply device 101 is limited, sufficient power to operate the device as a whole can not always be acquired.

Actually, since the capacity of a power feed line is limited because of the thickness and usability of a cable that constitutes an interface, the amount of power that is available is very low. In the present invention, only the units that are required are powered on in consonance with the amount of power that is supplied. For the interface, there are the IEEE 1394 standards and the USB standards, and according to these interface standards, the lines labeled by A and B in FIG. 1 represent coaxial cables.

Figure 2:
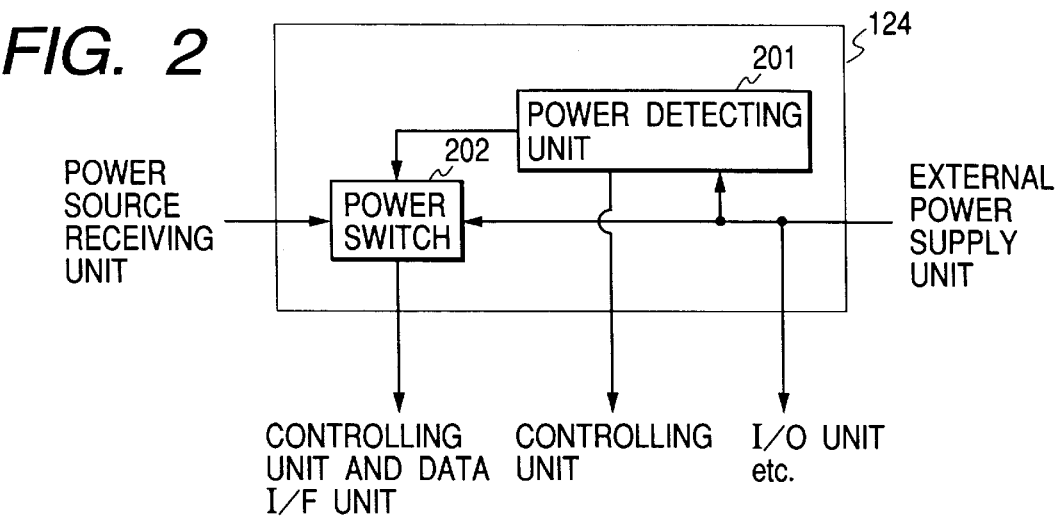
FIG. 2 is a block diagram illustrating the internal arrangement of a power management unit in FIG. 1.

FIG. 2 is a diagram illustrating the internal structure of the power management unit 124 in FIG. 1. In FIG. 2, a power detection unit 201 determines whether there is a supply of power from the external power source unit 123. Upon receipt of a control signal from the power detection unit 201, a power switch 202 selects the power supplied by the external power source unit 123, if it is available, and selects the power supplied by the power source receiving/supplying unit 122 when no power is available from the external power source unit 123.

In this embodiment, the power passing through the power switch 202 is supplied to the control unit 113, the storage unit 114 and the data I/F unit 115. Power from the external power source is supplied directly to the other individual units. The results of the power detection process are transmitted to the control unit 113 to provide information to the control unit 113 concerning whether or not power from the external power source is being supplied.

The outline of the processing will now be described. When the power supply device 101 is powered on and activated, the whole processing unit 103 permits the power source supplying unit 107 to output the minimum power required for data communications, and upon receipt of the power, the power reception device 102 that is connected to the power supply device 101 is activated, thereby initiating data communications between the power supply device 101 and the power reception device 102. During data communications, the power supply device 101 examines whether the power reception device 102 requires more power, and stores as power management information in the storage section 105 a required power capacity that is transmitted from the power reception device 102.

Based on the power management information, the whole processing unit 103 of the power supply device 101 determines whether power can be supplied to the power reception device 102. When the supply of power is enabled, the whole processing unit 103 orders the power source supplying unit 107 to supply power to the power reception device 102, so that it can obtain the power it requires.

If the supply of power is disabled, to convey a message to that effect to an operator, the whole processing unit 103 generates graphical data based on the power management information and transmits the graphical data to the display control unit 109, which thereafter displays the data on the display unit 110. At the same time, to use sound to inform an operator that the supply of power is disabled, the whole processing unit 103 generates tone data and outputs it to the loudspeaker 111. The notification means used may be either sound or a display. Another method may be employed, so long as a user is aware that the supply of power is disabled.

Since all the units in the power reception device 102 can be activated when power from an external power source is supplied, the power reception device 102 performs a normal operation. When no power from the external power source is supplied, the power reception device 102 employs the above described process to request power from the power supply device 101. When the power is received, the power reception device 102 activates the operation enabling units within the range of received power capacity and performs a limited operation. For example, the power reception device 102 may detect its operating state, or may notify the power supply device 101 of the ON/OFF state of the external power source.

The detailed processing for this embodiment will now be described while referring to the flowcharts in FIGS. 5 through 8.

Figure 5:
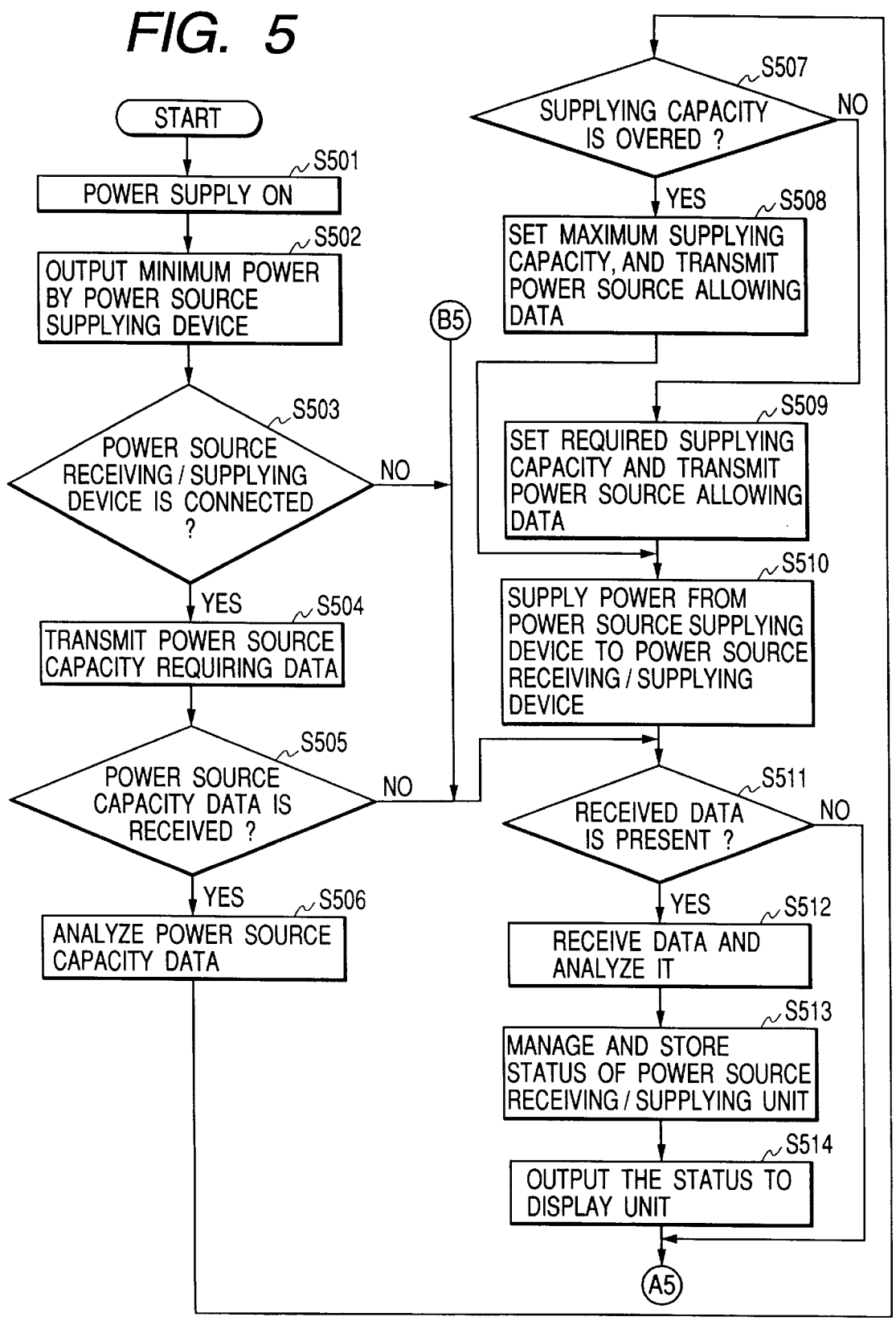
FIG. 5 is a flowchart showing the processing performed by a power supply device in the first embodiment.
Figure 6:
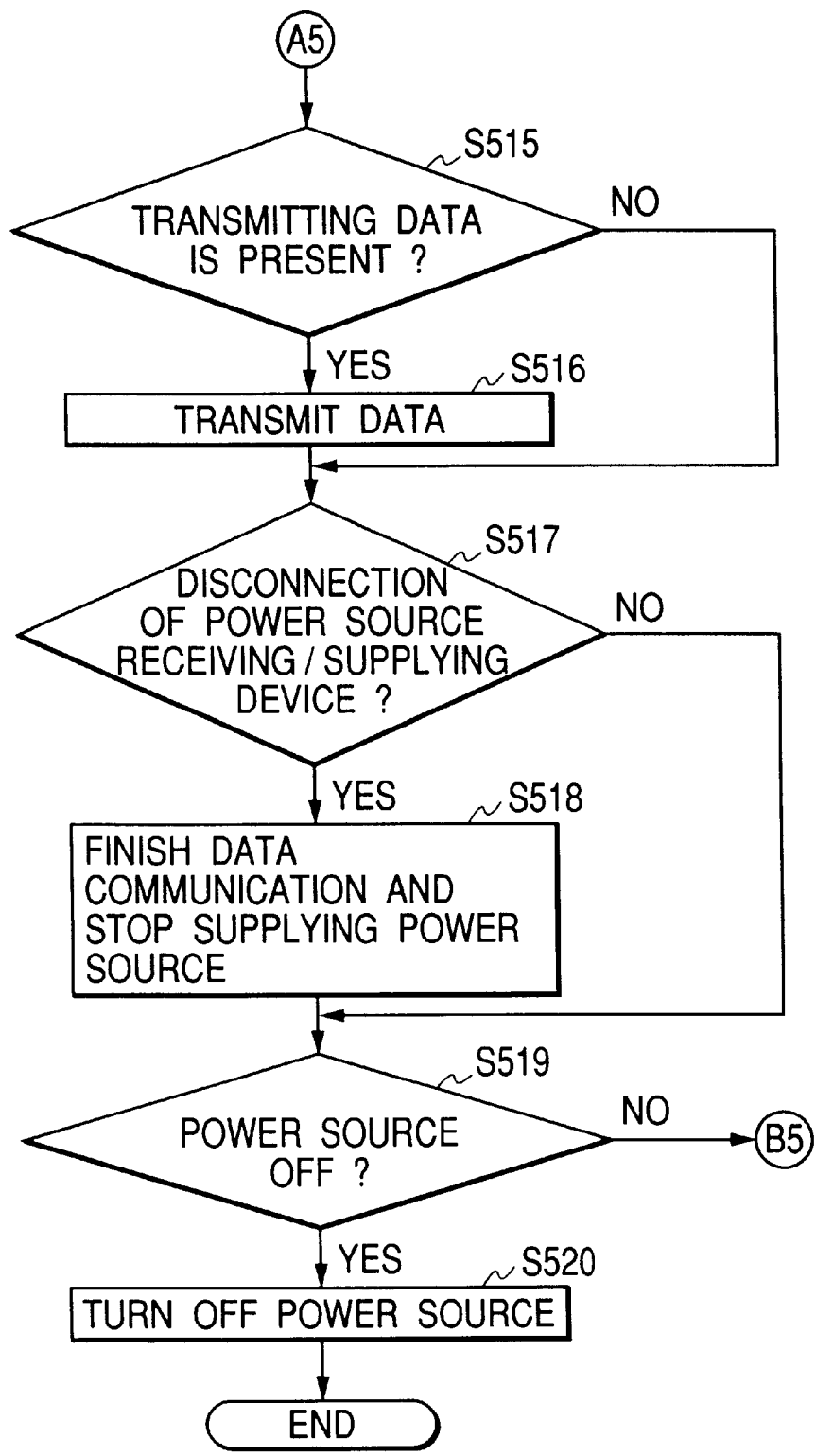
FIG. 6 is a flowchart showing the processing performed by the power supply device in the first embodiment.

FIGS. 5 and 6 are flowcharts for the processing performed by the power supply device 101. At step S501, the power supply device 101 is powered on and the power source 106 is activated, and at step S502, a minimum power is output to the power reception device 102, which is connected to the power supply device 101.

When at step S503 the power reception device 102 is activated, a check is performed to determine whether or not the power supply device 101 is connected to the power reception device 102. When the two are not connected, program control moves to step S511. When the two devices are connected, power capacity request data is transmitted to the power reception device 102. Then, when at step S505 the power source capacity data is received from the power reception device 102, at step S506 the contents of the data is analyzed.

If, at step S507, the required power exceeds the available power, program control advances to step S508. When the required power does not exceed the available power that can be supplied, program control moves to step S509. At step S508, the upper supply limit value of the power capacity is set, and is transmitted while being included in power source allowing data. At step S509, the power that is required by the power reception device 102 is set, and the value is transmitted to the device 102 while being included in the power source allowing data.

Following this, at step S510 the supply of power from the power supply device 101 to the power reception device 102 is initiated, and data transfer is begun. At step S511, a check is performed to determine whether there is data to be received. When there is no data to be received, program control goes to step S515. If there is data to be received, at step S512 the data is received and analyzed. At step S513, the state of the power source receiving/supplying unit 122 is acquired and stored, and at step S514 the state is output to the display unit 110.

Then, at step S515 a check is performed to determine whether there are data to be transmitted. When there are no data to be transmitted, program control moves to step S517. If there are data to be transmitted, at step S516 the data are transmitted.

At step S517, a check is performed to determine whether or not the power reception device 102 has been disconnected. If the power reception device 102 has not been disconnected, program control goes to step S519. If the power reception device 102 has been disconnected, at step S518 data communication is terminated and the supply of power is halted. When, at step S519, the power source 106 has been turned off, at step S520 the power supply device 101 is powered off. If the power source 106 has not been turned off, program control returns to step S511. The above disconnection can be, for example, when the connection between the power reception device 102 and the power supply device 101 has been physically severed.

Figure 7:
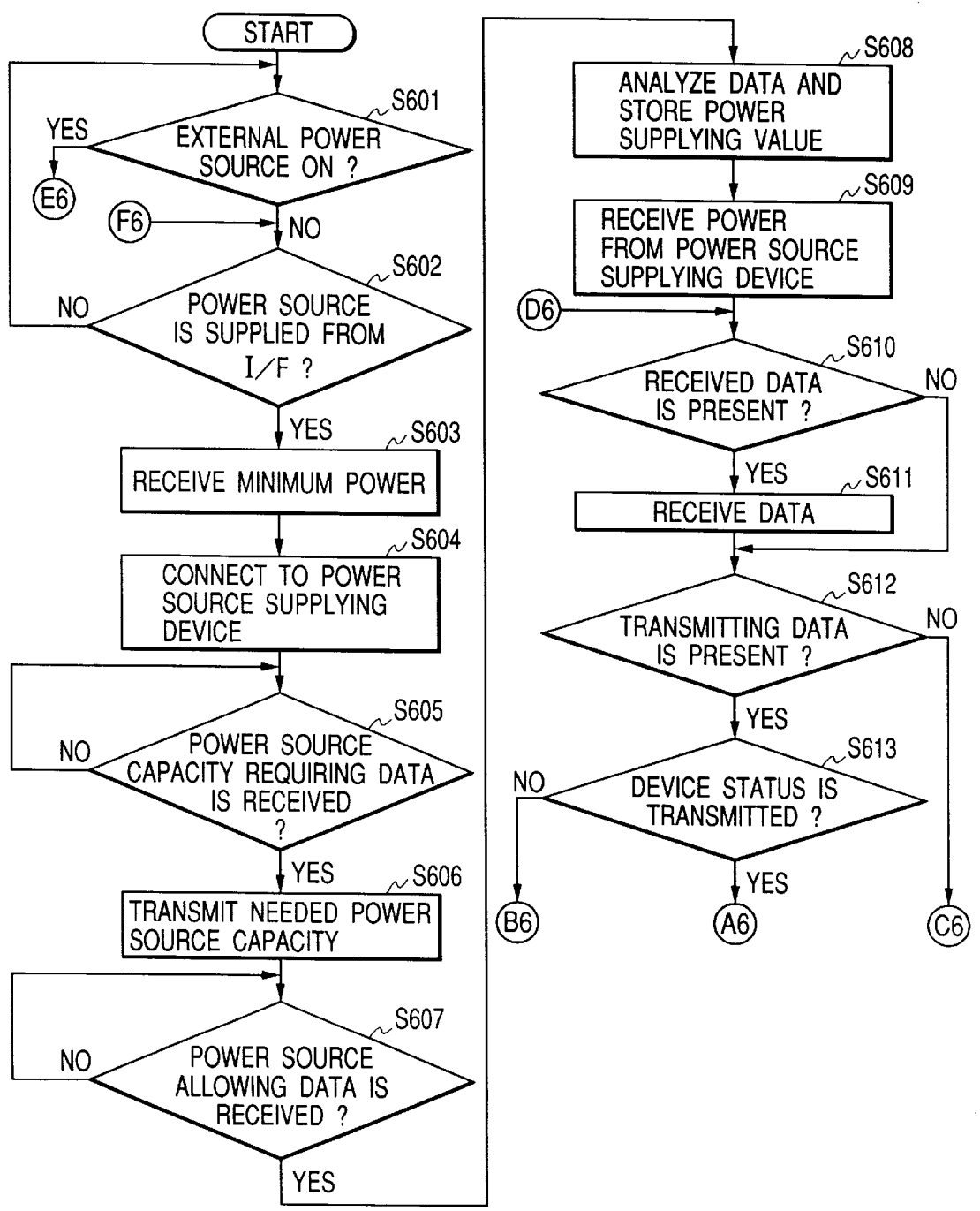
FIG. 7 is a flowchart showing the processing performed by a power reception device in the first embodiment.
Figure 8:
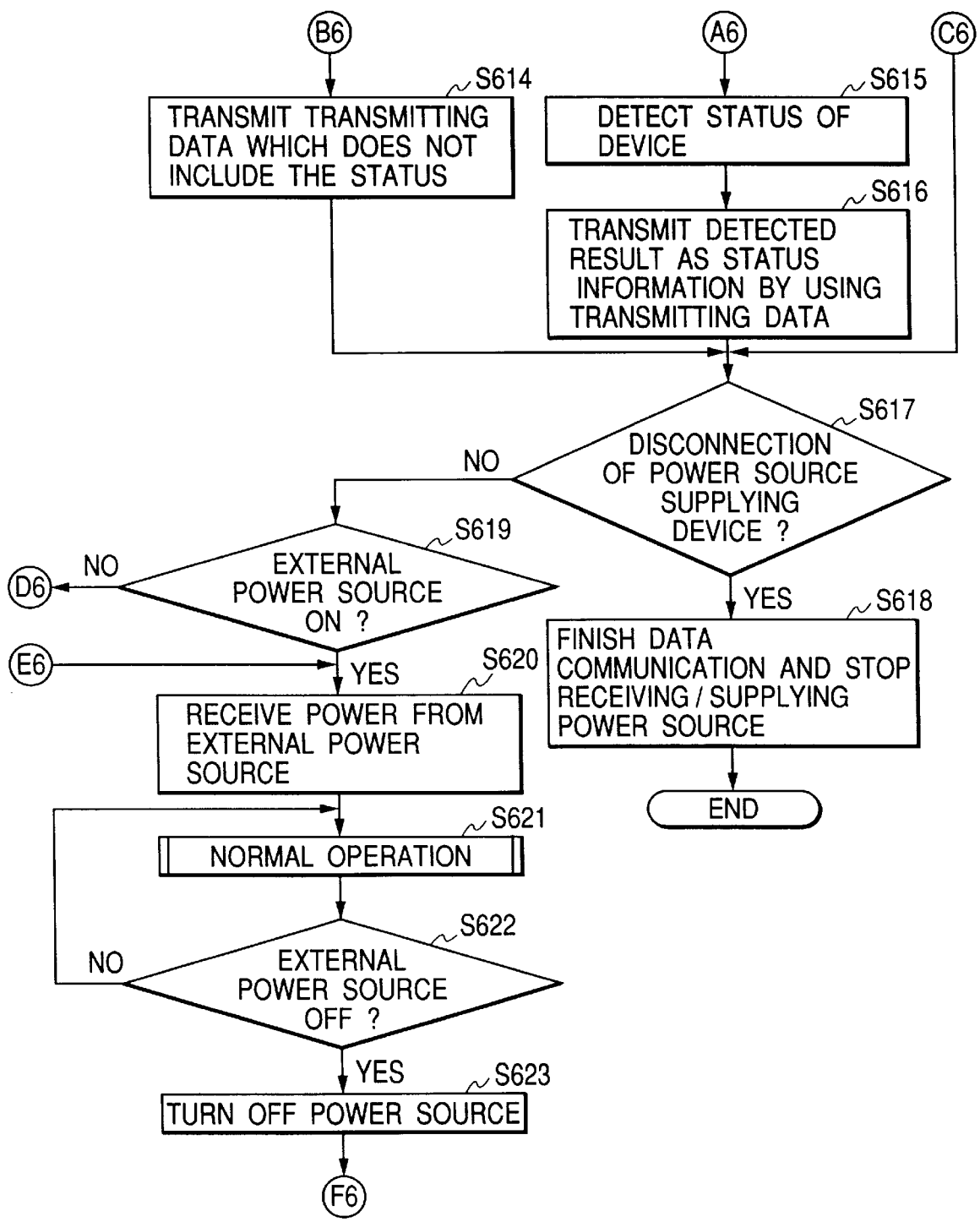
FIG. 8 is a flowchart showing the processing performed by the power reception device in the first embodiment.

FIGS. 7 and 8 are flowcharts for the processing performed by the power reception device 102.

First, at step S601 a check is performed to determine whether or not an external power source is on. If the external power is on, program control moves to step S620 in FIG. 8. When the external power source is not on, at step S602 a check is performed to determine whether power is being supplied. If no power is being supplied, program control returns to step S601. When power is being supplied, at step S603 a minimum power requirement that is determined in advance is received from the power supply device 101, and at step S604, the power reception device 102 is connected to the power supply device 101.

At step S605 a check is performed to determine whether power request data has been received from the power supply device 101. When the data has not been received from the power supply device 101, the power reception device 102 waits until the data are received. When the power capacity request data have been received, at step S606 a required power is transmitted as power source capacity data.

Then, at step S607 a check is performed to determine whether power source allowing data has been received. If the data has not yet been received, the power reception device 102 waits until it receives the data. When the power source allowing data have been received, at step S608 the data is analyzed and a supplied power value is stored in the storage unit 114, and at step S609 power from the power supply device 101 is received.

Following this, the operating mode is shifted to a data transfer mode, and at step S610 a check is performed to determine whether there are data to be received. If there are data to be received, at step S611 the data are received. At step S612 a check is performed to determine whether there are data to be transmitted. If there are no data to be transmitted, program control moves to step S617. If there are data to be transmitted, at step S613 a check is performed to determine whether or not the data to be transmitted indicate the state of the device. When the data do not indicate the state of the device, at step S614 the other data are transmitted, and program control goes to step S617. When the data to be transmitted indicate the state of the device, at step S615 the state of the device is detected.

For the detection of the state of the device, the state is periodically detected in a period during which the power reception device 102 is normally operated by power supplied from an external power source. Either each detected state is stored in the storage unit 114, or immediately before power is switched off the state of the device is detected and stored.

The storage unit 114 for holding the state data employs a battery-backup volatile memory or a nonvolatile memory to hold the state in addition to the previously mentioned supplied power value even when no power is being supplied by the external power source and the power supply device 101. Therefore, necessary information concerning the state of the device can be held. The power supply state can be obtained from the state of the power detection unit 201.

At step S616 the thus obtained state of the device is transmitted as status information.

At step S617 a check is performed to determine whether or not the power supply device 101 has been disconnected. If the power supply device 101 has been disconnected, at step S618 data communication is terminated, power reception is halted, and processing is thereafter terminated. When the power supply device 101 has not been disconnected, at step S619 a check is performed to determine whether or not the external power source is on. If the external power source is off, program control returns to step S610. If the external power source is on, at step S620 the power from the external power source is received and at step S621 normal operation is performed. At step S622, in a period during which the external power source is on, the normal operation is continued. When, at step S622, the external power source is off, at step S623 the power is switched off and program control returns to step S602.

As a result, even when the external power source is off, the state of the device can be acquired.

When, for example, the operation of the power supply device 101 is disabled because its power switch is off, a user can be notified that the power of the power supply device 101 is off. In other words, a message to turn on the power switch can be provided for a user.

Furthermore, since the state of the power supply device 101 immediately before the power is switched off is stored, the state can be acquired before the power switch is turned on, even when a lack of paper or a paper jam occurs, or insufficient ink or toner remains. Therefore, it is possible to eliminate a wasteful process during which the power is turned on and off again after the state is checked and the unfavorable condition is corrected.

A second embodiment of the present invention will now be described while referring to FIGS. 3 and 4. In this embodiment, a small supply of power from a power supply device 101 is effectively employed to detect the internal state of a power reception device 102.

Figure 3:
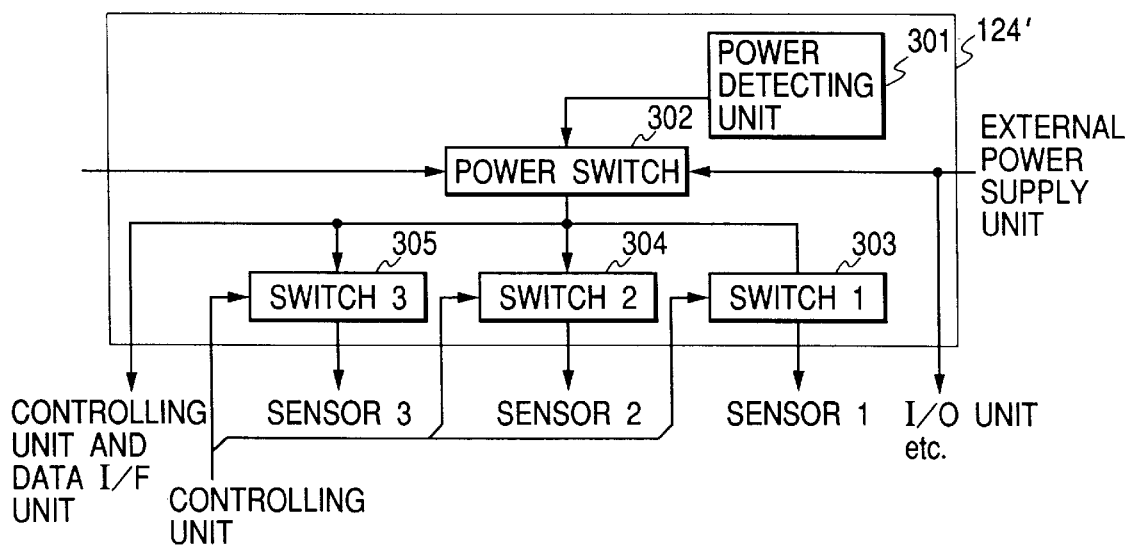
FIG. 3 is a block diagram illustrating a component arrangement according to a second embodiment of the present invention.

FIG. 3 is a diagram illustrating the internal arrangement of a power management unit 124. In FIG. 3, a power detection unit 301 determines whether or not power from an external power source is being supplied. In accordance with a control signal from the power detection unit 301, a power switch 302 selects the power supplied by the external power source if it is available, and selects the power supplied by a power source receiving/supplying unit 122 when no is available from the external power source. Switches 303, 304 and 305 are turned on and off when the power from the power switch 302 is supplied to a sensor unit 117. In this embodiment, three switches 1 to 3 are provided.

As well as in the first embodiment, power is supplied directly from the power switch 302 to a control unit 113 and a data I/F unit 115, and power is supplied through the switches 303 to 305 to the respective sensors. The control unit 113 employs the switches 303 to 305 to control the supply of power to the individual sensors.

Power from the external power source is supplied directly to the remaining units. The result of the power detection is transmitted to the control unit 113 to notify the control unit 113 of whether or not there is supply of power from the external power source.

Figure 4:
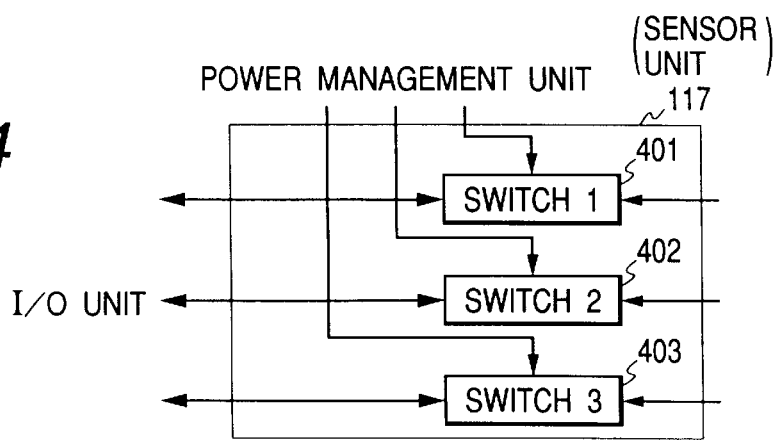
FIG. 4 is a block diagram illustrating the internal structure of a sensor according to the second embodiment of the present invention.

FIG. 4 is a diagram illustrating the internal structure of the sensor unit 117. In FIG. 4, sensors 401, 402 and 403 detect the states of the individual units. Specifically, the sensors 401 to 403 are a sensor (1) for detecting the presence of paper in a paper feeding section; a sensor (2) for detecting the occurrence of paper jams during the paper feeding; and a sensor (3) for detecting the remaining amount of ink or toner. The sensors are not limited to the ones described, and any type of sensor can be employed.

Figure 9:
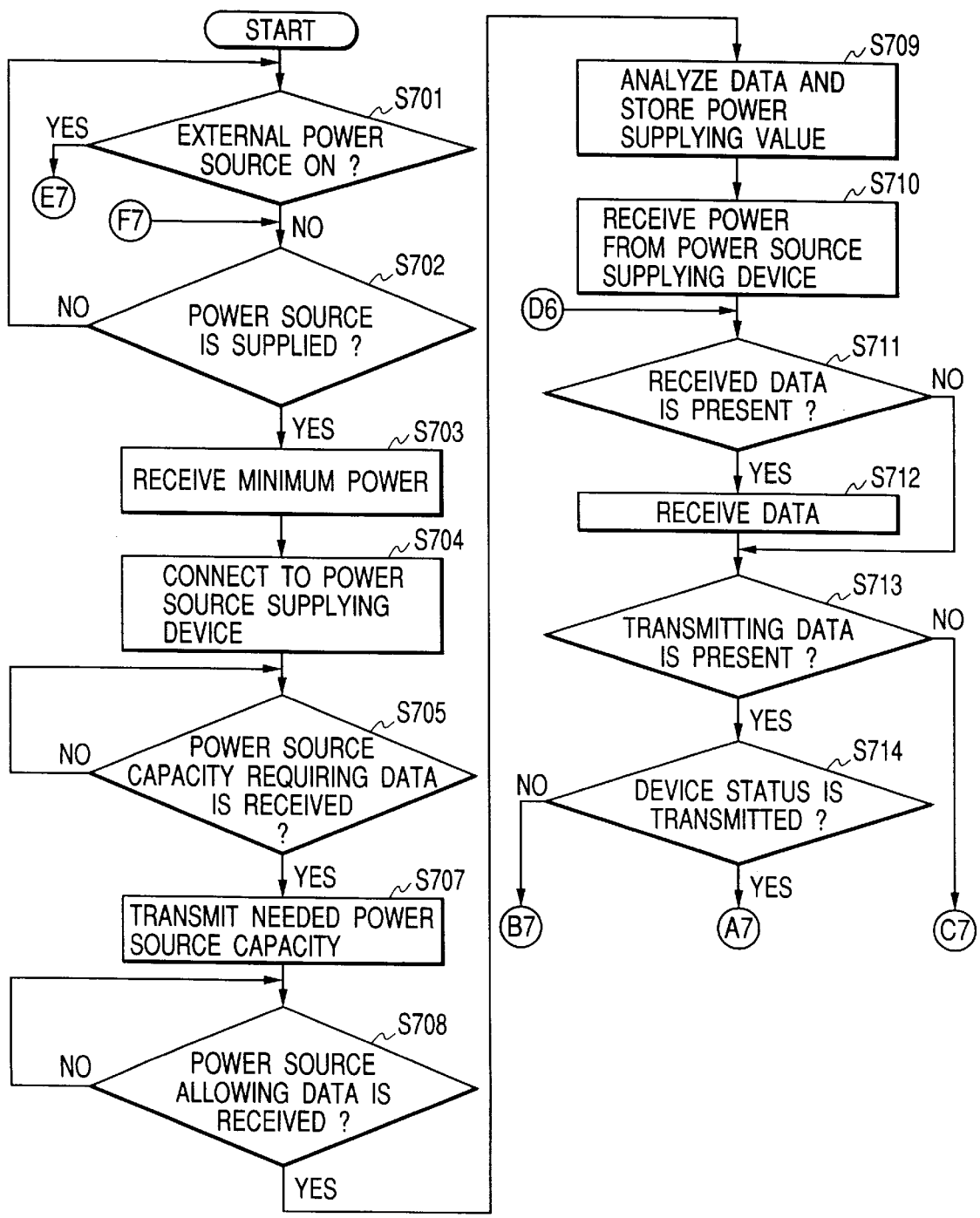
FIG. 9 is a flowchart showing the processing performed by a power reception device in the second embodiment.
Figure 10:
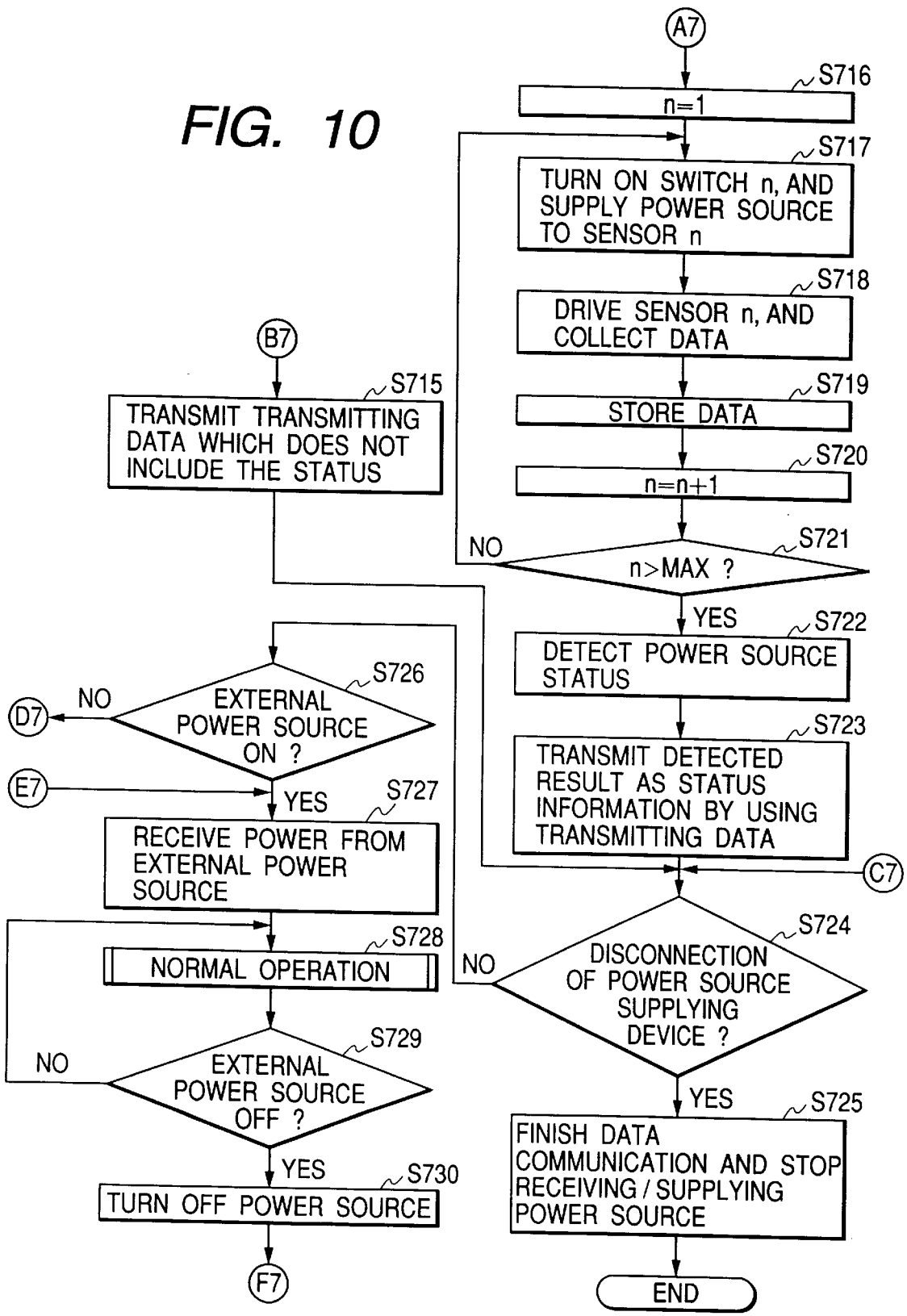
FIG. 10 is a flowchart showing the processing performed by the power reception device in the second embodiment.

FIGS. 9 and 10 are flowcharts for the processing performed by the power reception device 102 in the second embodiment.

First, at step S701 a check is performed to determine whether or not an external power source is on. If the external power is on, program control moves to step S727. When the external power source is not on, at step S702 a check is performed to determine whether there is a supply of power. If there is no supply of power, program control returns to step S701. When there is a supply of power, at step S703 a minimum power requirement that is determined in advance is received from the power supply device 101, and at step S704, the power reception device 102 is connected to the power supply device 101.

At step S705 a check is performed to determine whether power capacity request data has been received from the power supply device 101. When the data has not been received from the power supply device 101, the power reception device 102 waits until the data is received. When the power capacity request data has been received, at step S707 a required power is transmitted as power source capacity data.

Then, at step S708 a check is performed to determine whether power source allowing data has been received. If the data has not yet been received, the power reception device 102 waits until it receives the data. When the power source allowing data has been received, at step S709 the data is analyzed and a supplied power value is stored, and at step S710 power from the power supply device 101 is received.

Following this, the operating mode is shifted to a data transfer mode, and at step S711 a check is performed to determine whether there are data to be received. If there are data to be received, at step S712 the data are received. At step S713 a check is performed to determine whether there are data to be transmitted. If there are no data to be transmitted, program control moves to step S718. If there are data to be transmitted, at step S714 a check is performed to determine whether or not the data to be transmitted indicate the state of the device. When the data do not indicate the state of the device, at step S715 the other data are transmitted, and program control goes to step S724. When the data to be transmitted indicate the state of the device, at step S716 n is set to 1.

Then, at step S717 the control unit 113 turns on the switch (1) and supplies power to the sensor (1). At step S718, the sensor (1) is driven to collect data, and at step S719 the collected data are stored. At step S720 n is incremented by one, and at step S721 n is compared with MAX (the number of sensors required for detection).

When n is equal to or smaller than MAX, program control returns to step S717. When n is greater than MAX, at step S722 the power source status is detected. And at step S723, the detected state is transmitted as status information.

At step S724 a check is performed to determine whether or not the power supply device 101 has been disconnected. If the power supply device 101 has been disconnected, at step S725 data communication is terminated, power reception is halted, and processing is thereafter terminated. When the power supply device 101 has not been disconnected, at step S726 a check is performed to determine whether or not the external power source is on. If the external power source is off, program control returns to step S711. If the external power source is on, at step S727 power from the external power source is received and at step S728 a normal operation is performed. At step S729, during a period in which the external power source is on, the normal operation is continued. When, at step S729, the external power source is off, at step S730 the power is off. Program control thereafter returns to step S702.

As a result, even when the external power source is off, the state in the device can be acquired in advance.

When, for example, the operation is disabled because the power switch is off, as in the previous embodiment, a message can be provided, notifying a user that the power is off and that the power switch should be turned on.

Furthermore, since the current state of the device can be acquired by sequentially supplying power to the individual sensors, while storing of the state in, for example, nonvolatile memory and the powering on of the device are not required. When, for example, a lack of paper or a paper jam occurs, or insufficient ink or toner remains, the state can be acquired before the power switch is turned on. Therefore, it is possible to eliminate a wasteful process during which the power is turned on and off again after the state is checked and the unfavorable condition is corrected. In addition, in this embodiment, since a plurality of sensors in the sensor unit are operated in a time-sharing manner by supplying power to them, the state of the power reception device 102 can be acquired even when the power supply capacity of the power supply device 101 is limited.

Figure 11:
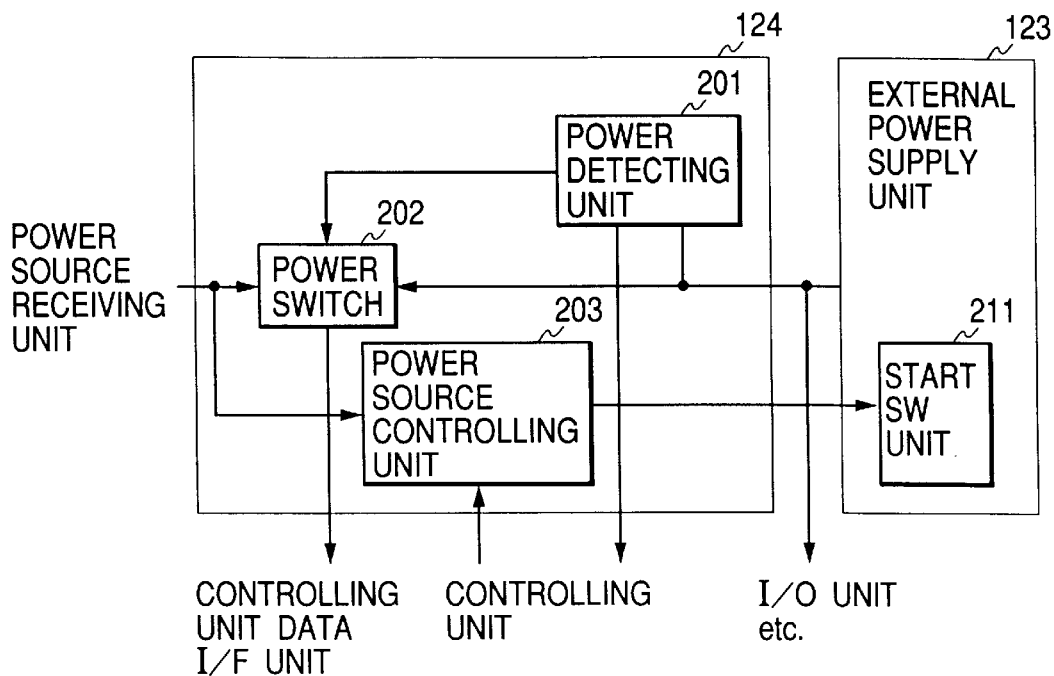
FIG. 11 is a block diagram illustrating a component arrangement according to a third embodiment of the present invention.

FIG. 11 is a block diagram illustrating the arrangement according to a third embodiment of the present invention. The same reference numerals as are used in FIG. 2 are also used to denote corresponding components. In FIG. 11, in accordance with a control signal received from a control unit 113, a power source control unit 203 controls a start switch 211 in an external power source unit 123. By controlling this switch, the external power source unit 123 can be turned on or off. The start switch (SW) 211 is used to switch between the starting and the halting of the operation of the external power source unit 123.

Figure 12:
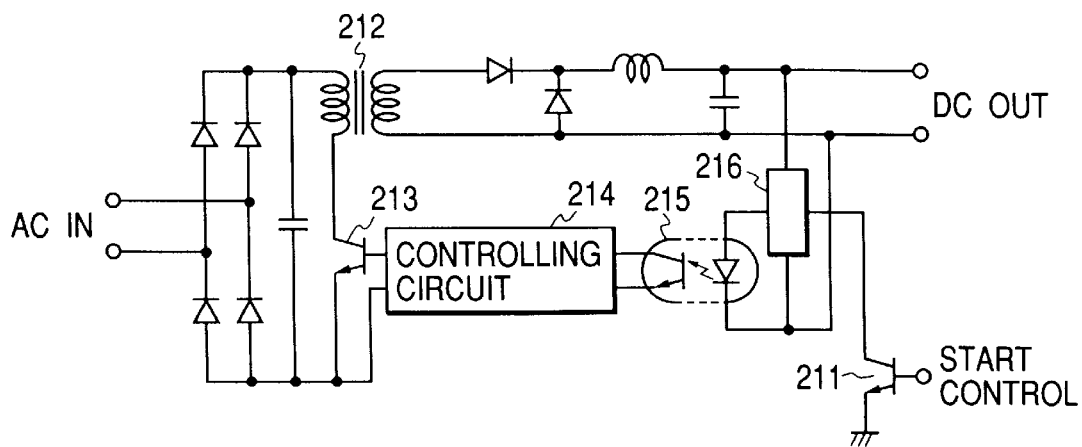
FIG. 12 is a circuit diagram illustrating an example external power source.

FIG. 12 is a circuit diagram for explaining the principle of an example external power source unit 123. This circuit constitutes a switching regulator. A direct current, which is obtained by rectifying and smoothing an AC input, is transmitted to the primary side of a high frequency transformer 212, is switched by a switching element 213, such as a transistor, and is output from the secondary side of the transformer 212. A transistor is employed as the start switch 211. A control circuit 214, for exercising PWM control of the switching element 213, is connected via a photocoupler 215 to an error amplifier 216.

In this embodiment, a downstream external power source is activated upon a request from a host, and the downstream device is set in an operation enabled state. This process is performed by the power source control unit 203 in the power management unit 124.

As a result, the power supply operation (oscillation of a SW power source) can be completely halted when it is difficult to activate the power source unit. However, if a timer is required for the management of an ink-jet head, such as when the stop position of the head is to be defined as a predetermined position, a battery-backed up timer such as is used in a notebook printer can be mounted for managing time.

A mechanical switch is employed to activate a power source. The shutdown of the power source in the power-OFF sequence is logically performed by power supplied by a battery or an I/F (see the block diagram in FIG. 11).

The detailed processing for the third embodiment will now be described while referring to the flowcharts in FIGS. 13 to 16.

Figure 13:
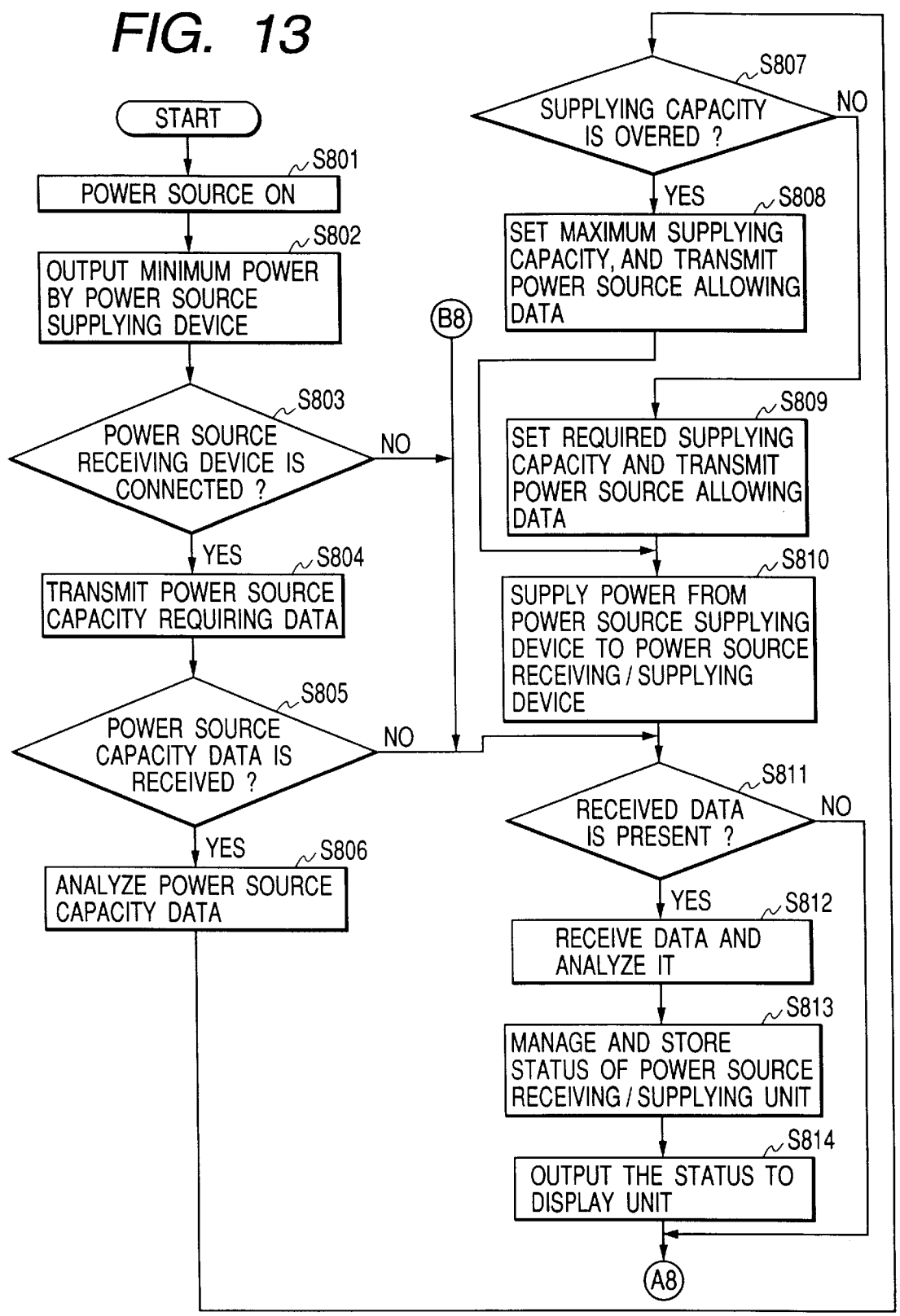
FIG. 13 is a flowchart showing the processing performed by a power supply device in a third embodiment.
Figure 14:
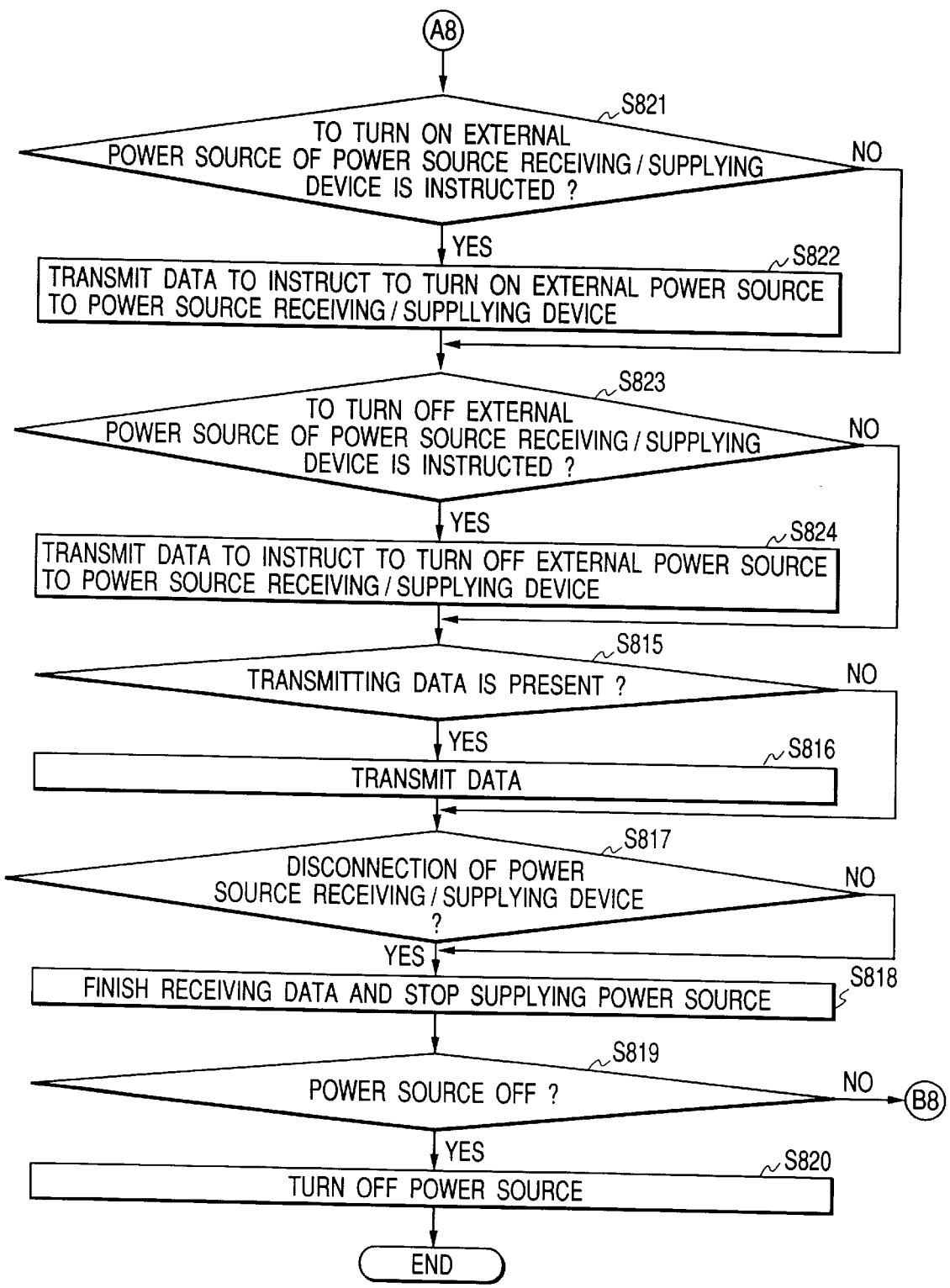
FIG. 14 is a flowchart showing the processing performed by the power supply device in the third embodiment.

FIGS. 13 and 14 are flowcharts for the processing performed by the power supply device 101. First, at step S801 the power is on. Since the processes at steps S801 to S814 are the same as those in steps S501 to S514 in FIG. 5, no further explanation for them will be given.

When, at step S814, the state of the power source receiving/supplying unit 122 is output to the display unit 110, at step S821 a check is performed to determine whether or not the power reception device 102 has requested that an external power source be turned on. If there is no request, program control moves to step S823. If there is such a request, at step S822 data for instructing the turning on of the external power source are transmitted to the power reception device 102.

At step S823 a check is performed to determine whether or not the power reception device 102 has requested that the external power source be turned on. If there is no such request, program control goes to step S815. If there is such a request, at step S824 data for instructing the turning off of the external power source are transmitted to the power reception device 102.

Since the processes at steps S815 to S820 are the same as those at steps S515 to S520 in FIG. 6, no further explanation for them will be given.

Figure 15:
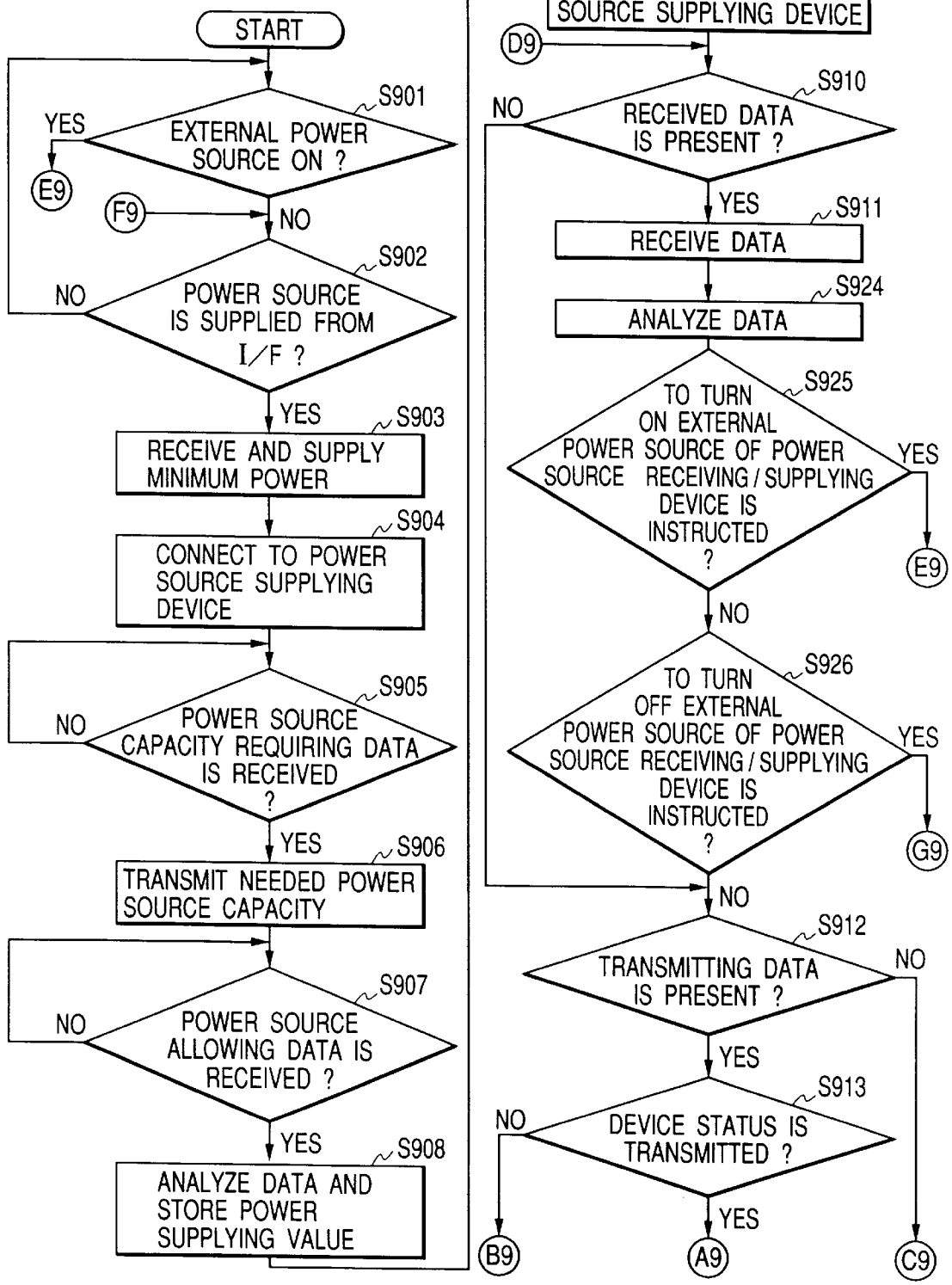
FIG. 15 is a flowchart showing the processing performed by a power reception device in the third embodiment.
Figure 16:
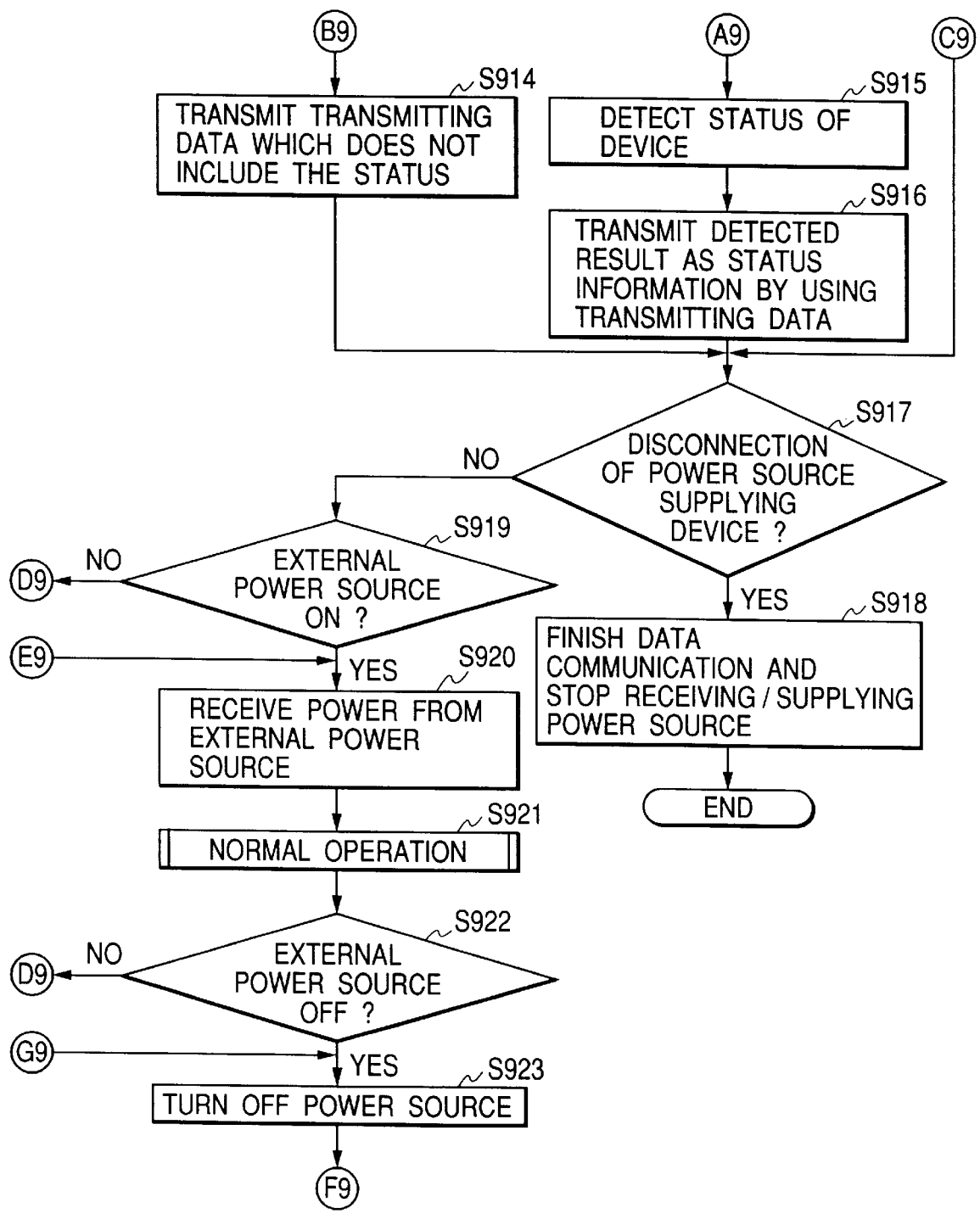
FIG. 16 is a flowchart showing the processing performed by the power reception device in the third embodiment.

FIGS. 15 and 16 are flowcharts for the processing performed by the power reception device 102. First, at step S901 an external power source is turned on. Since the processes at steps S901 to S911 are the same as those at steps S601 to S611 in FIG. 7, no further explanation for them will be given.

When at step S911 data are received, at step S924 the data are analyzed, and at step S925, a check is performed to determine whether the data constitute an instruction to turn on the external power source. If the data constitute an instruction to turn on the external power source, program control moves to step S920. If the data do not constitute an instruction to turn on the external power source, at step S926 a check is performed to determine whether or not the data constitute an instruction to turn off the external power source. When the data constitute an instruction to turn off the external power source, program control moves to step S923. When the data do not constitute such an instruction, program control goes to step S912.

Since the processes at steps S912 to S921 are the same as those at steps S612 to S621 in FIG. 8, no further explanation for them will be given. If, at step S922, the external power source is not off, program control goes to step S919. If the external power source is off, at step S923 the power is off. Program control thereafter returns to step S902.

As is described above, in this embodiment, the external power source of the other device can be activated by a request signal, and usability is, therefore, enhanced.

In the above embodiments, the interface between the power source supplying unit 107 and the power source receiving/supplying unit 122, and the interface between the data I/F unit 108 and the I/F unit 115 may be either one called IEEE 1394, or one other than the USB. In other words, any interface by which power can be supplied between the devices can be employed.

As is described above, in the above embodiments, the OFF state of a power switch of a device can be detected without powering on the device. Therefore, a power on instruction can be provided for a user, and usability can be improved.

In addition, the current state or the preceding state of the device can be acquired before the device is powered on. Thus, it is possible to eliminate a wasteful process during which the device is powered on to check the state, then powered off to correct an unfavorable condition, and again powered on for confirmation. The usability can be drastically enhanced.

Furthermore, since the external power source of the other device is activated upon the receipt of a request signal, the usability is further improved.

In the above embodiments, a computer and a printer have been employed; however, the present invention is not limited to those devices, and can be used effectively for a combination of other devices, such as a computer and a CD-ROM reproduction device.

The present invention is especially effective when image forming material, such as ink or toner, and a recording medium for a printer are to be replaced while the power is off.

As is apparent from the above description, according to the embodiment, the above processing can be performed without requiring any special hardware.

The objects of the present invention can also be achieved by loading, into a system, or a device, a storage medium on which is recorded software program code for accomplishing the functions in the embodiments, and by a computer (a CPU or an MPU) in the system, or in the device, reading and executing the program code that is stored in the storage medium.

In this case, the program code that is read from the storage medium implements the functions in the previously mentioned embodiments, and the storage medium on which the program code is stored accomplishes the present invention.

A storage medium on which program code is recorded is, for example, a floppy disk, a hard disk, an optical disk, a magneto optical disk, a CD-ROM, a CD-R, a magnetic tape, a nonvolatile memory card, or a ROM.

The present invention also includes a case wherein, to accomplish the functions in the above embodiments, program code read from a storage medium is written in a memory of a function expansion board, which is inserted in a computer or a printer, or a function expansion unit, which is connected to a computer or a printer, and in consonance with a program code instruction, a CPU in the function extension board or the function extension unit performs one part or all of the processing.

The present invention is not limited to the above described embodiments, and various modifications can be provided within the scope of the claims.

What is claimed is:

1. A data communication system, which exchanges data among a plurality of devices includinq a printer, comprising:
   power supply means for supplying power from a first device to said printer;
   detection means for detecting a plurality of states of said printer by employing power supplied by said power supply means;
   transmission means for transmitting status information detected by said detection means to said first device;
   storage means for storing said status information for said printer, which is received by said first device; and
   output means for outputting said status information for said printer that is stored in said storage means.

2. A data communication system according to claim 1, further comprising:
   division means for dividing power supplied by said power supply means, and
   switching means for sequentially switching power that is divided by said division means in order to activate individual sections,
   wherein said detection means detects the state of said device in the order in which said individual sections are activated by said switching means.

3. A data communication system according to claim 1, further comprising a power source control unit for, upon receipt of a request signal from said first device, turning on an external power source for said printer.

4. A data communication system according to claim 1, wherein said power supply means conforms to the IEEE 1394 standards or the USB standards.

5. A data communication system according to claim 1, wherein said transmission means transmits said status information according to the IEEE 1394 standards or the USB standards.

6. A data communication device, which performs data communications with a printer, comprising:
   power supply means for outputting power to said printer;
   storage means for storing status information for a plurality of states of said printer that is detected using said power that is supplied by said power supply means; and
   output means for providing an output in consonance with contents stored in said storage means.

7. A data communication device according to claim 6, wherein said power supply means conforms to the IEEE 1394 standards or the USB standards.

8. A printer, which performs data communications with an external device, comprising:
   power reception means for receiving power from said external device;
   detection means for detecting a plurality of states of said printer using said power that is received; and
   transmission means for transmitting status information for the plurality of states detected in said detection means to said external device.

9. A printer according to claim 8, wherein said transmission means transmits said status information according to the IEEE 1394 standards or the USB standards.

10. A printer according to claim 8, further comprising:
    division means for dividing power received by said power reception means, and
    switching means for sequentially switching power that is divided by said division means in order to activate individual sections of said printer,
    wherein said detection means detects the state of said printer in the order in which said individual sections are activated by said switching means.

11. A printer according to claim 8, further comprising a power source control unit for, upon receipt of a request signal from said external device, turning on an external power source.

12. A storage medium, on which is recorded a data communication program for exchanging data among a plurality of devices including a printer, said data communication program comprising the steps of:
    supplying power from a first device to the printer;
    detecting a plurality of states of the printer by using the supplied power, and transmitting obtained status information to the first device; and
    storing in storage means the status information for the printer, which is received by the first device, and outputting from the first device the status information for the printer that is stored in storage means.

13. A storage medium, on which is recorded a data communication program for performing data communications with a printer, said data communication program comprising the steps of:

outputting power to the printer;

storing in storage means status information for a plurality of items of the printer detected after the printer has been powered on by the power from said power outputting step; and outputting from output means the status information stored in the storage means.

14. A storage medium, on which is recorded a data communication program for performing data communications between a printer and an external device, said data communication program comprising the steps of:

receiving power to the printer from the external device;

detecting a plurality of states of the printer using the received power; and transmitting status information for the detected plurality of states to said external device.

15. A storage medium according to claim 14, wherein said data communication program further comprises the steps of:

dividing power that is received, and sequentially switching said power that is divided in order to activate individual sections of the printer; and detecting the state of the printer in the order in which said individual sections are activated.

16. A storage medium according to claim 14, wherein said data communication program further comprises the step of turning on an external power source upon receipt of a request signal from the external device.

* * * * *

UNITED STATES PATENT AND TRADEMARK OFFICE
CERTIFICATE OF CORRECTION

PATENT NO. : 6,016,519
DATED : January 18, 2000
INVENTOR(S) : Makoto Chida et al.

It is certified that error appears in the above-identified patent and that said Letters Patent is hereby corrected as shown below:

Title page,
Item [54] "DATA COMMUNICATION SYSTEM, DATA COMMUNICATION DEVICE AND MEMORY MEDIUM, FOR STORING DATA COMMUNICATION PROGRAM" should read -- SYSTEM FOR DETECTING A PLURALITY OF STATES OF A PRINTER WITHOUT HAVING TO POWER THE PRINTER ON --.

Column 1,
Line 1, "DATA COMMUNICATION SYSTEM" should read -- SYSTEM FOR DETECTING A PLURALITY OF STATES OF A PRINTER WITHOUT HAVING TO POWER THE PRINTER ON --;
Line 2-4, should be deleted.

Column 5,
Line 38, "is" should read -- are --.

Column 7,
Line 46, "no" should read -- none --.

Signed and Sealed this

Fourth Day of December, 2001

*Attest:*

NICHOLAS P. GODICI
*Attesting Officer*   *Acting Director of the United States Patent and Trademark Office*